M. FISCHER.
CHANGING GEARING FOR AUTOMOBILES.
APPLICATION FILED AUG. 1, 1911.

1,085,677. Patented Feb. 3, 1914.

Witnesses:
Eugene Wening
Clarissa Franck

Inventor
Martin Fischer
by Otto ____
his Attorney

UNITED STATES PATENT OFFICE.

MARTIN FISCHER, OF ZURICH, SWITZERLAND, ASSIGNOR TO MOTOR AND GEAR IMPROVEMENT COMPANY, A CORPORATION OF NEW YORK.

CHANGING-GEARING FOR AUTOMOBILES.

1,085,677. Specification of Letters Patent. Patented Feb. 3, 1914.

Application filed August 1, 1911. Serial No. 641,784.

*To all whom it may concern:*

Be it known that I, MARTIN FISCHER, citizen of Switzerland, residing at Zurich, Switzerland, have invented new and useful Improvements in Changing-Gearing for Automobiles, of which the following is a specification.

My invention relates to speed changing gearing for motor cars and like vehicles, and relates especially to the manner of supporting the universally jointed shaft extending from the motor shaft to the driving gear. In structures of this kind the universally jointed shaft carries a pinion at one end adapted to mesh with the different sized gear wheels when the speed of the vehicle is to be changed, and in making such change the parts are liable to considerable shock and strain causing derangement or forcing of the gears out of mesh which it is the main purpose of my invention to avoid in order to insure efficiency of the gearing, smoothness of running, absence of noise and other desired qualifications.

In the preferred form of the invention the means which I employ for obviating derangement and other troubles due to the shock and strain consists of a suitably slotted plate which acts as a guide for the movement of the universally jointed shaft and its pinion in changing from one gear to another, arranged in a suitable way and in such combination as I will hereinafter describe.

When shifting a gear carried on a shaft not fixedly supported, it has been heretofore impractical to get and to preserve sufficiently accurate meshing of the gears to insure satisfactory and practical results. By my invention I insure permanently such accuracy and stability of meshing of the gears that a most perfect and durable change gearing, as a whole, is obtained.

Other features of my construction give unusual compactness, strength and efficiency.

The preferred embodiment of my invention is illustrated in the accompanying drawing, wherein—

Figure 1:
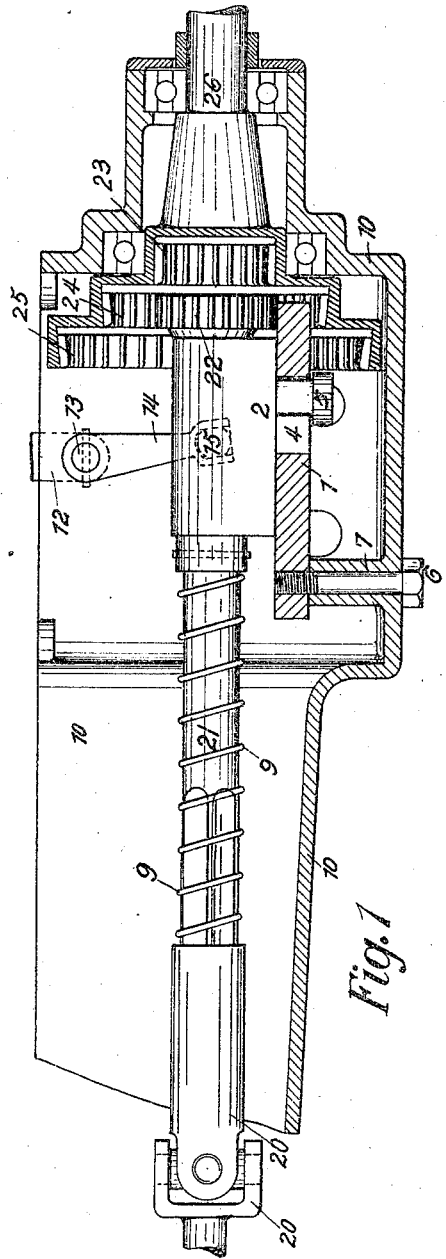
Figure 2:
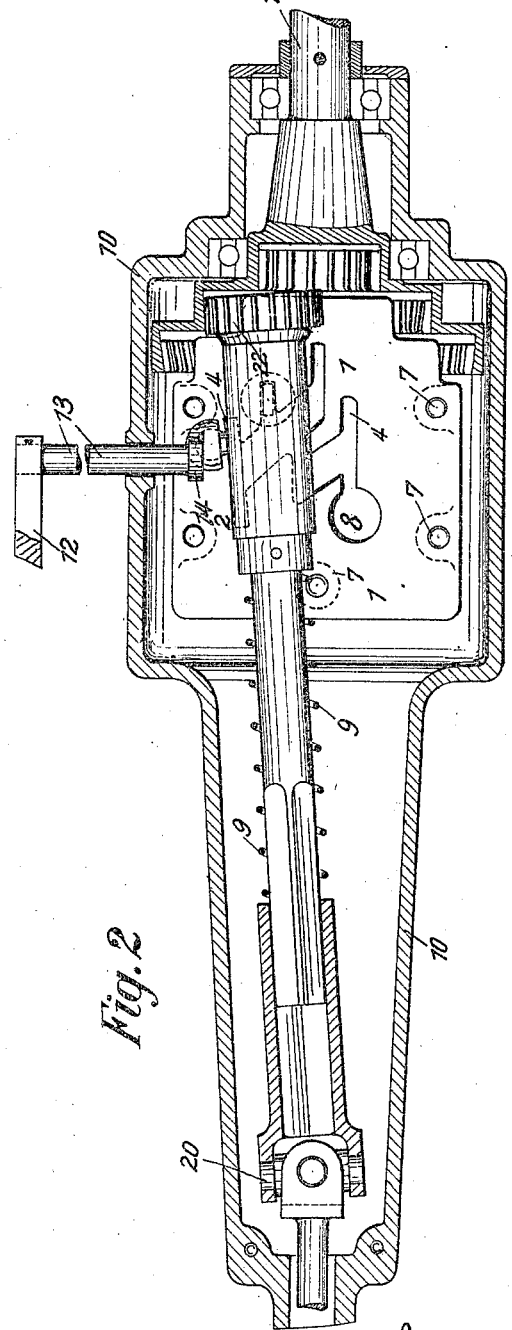

Figure 1 is a vertical longitudinal section illustrative of the invention; and Fig. 2 is a horizontal sectional view thereof.

Referring to the drawing 20 designates a yoke connected to the motor shaft, 21 the shaft which is universally jointed at 20 to the motor shaft.

10 designates the gear case or box having legs or hollow supporting standards 7 for the guide plate 1 provided with the suitably formed slot 4. The guide plate 1 is firmly secured to the gear case by means of the threaded bolts 6, said guide plate extending rearwardly a sufficient distance to enter the space within the internally toothed gear wheels 23, 24 and 25. These gear wheels are formed rigidly with a sleeve or shaft 26 which serve to drive the rear axle in any well-known manner and which I have not deemed it necessary to illustrate. At its rear or inner end the universally jointed shaft 21 is provided with the pinion 22 adapted to selectively mesh with any of the gear wheels 23, 24, or 25. Adjacent the pinion 22, the shaft 21 is surrounded by a sleeve 2 having a depending portion passing through the slot 4 in the plate 1, said depending portion terminating in a head or abutment 5 so as to prevent the sleeve 2 from working out of the slot 4 in the plate 1. The numeral 8 in the drawing represents a substantially annular opening in the plate 1 through which opening the depending portion of the sleeve 2 is inserted when the parts are assembled. By this arrangement it will be seen that the plate 1 projects into the internal gear crown, and that the plate is very rigidly supported on casing 10, which also supports the gear crown, thereby holding plate 1 in rigid relation with the gear crown and the gears 23, 24 and 25; while the bearing block 2 is rigidly supported on plate 1 close to the end of the plate projecting into the gears, and that the bearing block 2 supports shaft 21 immediately adjacent to the pinion 22. Consequently the combination gives a rigid support of the pinion 22 with respect to the internal gears with which it is to mesh.

The sleeve 2 is provided on its periphery with a ball-head 15 adapted to be engaged by the socket portion 14 of a link 13 operable from the lever 12. By suitable movement of the lever 12 the sleeve 2 with the shaft 21 and the pinion 22 may be suitably shifted to engage any of the gear wheels 23, 24 or 25. The shaft 21 is surrounded by a spring 9 tending to return the sleeve 2 to initial position when pressure is removed from the operating lever 12.

While changes may be made from the details, or otherwise, from the particular form shown and described it will be understood that such may be done without departing from my invention, but

What I claim and desire to secure by Letters Patent is:—

1. In combination in a change gear mechanism, a flexibly jointed drive shaft, a casing or crown having a plurality of internal gears, a pinion on said shaft adapted to engage said internal gears, a movable bearing block supporting said shaft immediately adjacent to said pinion, a plate supported in rigid relation to said internal gears and projecting into the crown or casing carrying said gears, means to support said bearing block rigidly in predetermined positions on said plate in close proximity to said internal gears, and means for shifting the bearing block and pinion into the respective positions for driving engagement with said internal gears.

2. In combination in a change gear mechanism, a flexibly jointed power transmission shaft, a pinion on said shaft, a plurality of internal gears of different sizes adapted to mesh with said pinion, a supporting casing for said internal gears, a plate rigidly carried by said casing and projecting into said internal gears, a bearing block adapted to be rigidly supported in a plurality of positions on said plate and supporting the end of said power shaft immediately adjacent to the pinion, and means for shifting said pinion to different positions of meshing with the respective internal gears.

3. In combination in a change gear mechanism, a laterally movable power shaft connected at one end to a flexible joint and a rigidly secured pinion carried at the other end, a crown or casing embodying a plurality of internal gears into which the pinion end of said shaft is adapted to project and engage with the internal gears, respectively, a plate for supporting said pinion projecting into the crown of internal gears, a block supported on said plate and adapted to hold said pinion in rigid relation with said plate, said plate having a guide slot with a plurality of notches, and a projection from said block in close proximity to said pinion to lock the pinion rigidly to said plate in predetermined positions for engagement with the respective internal gears.

In testimony whereof I have signed my name to this specification in the presence of two subscribing witnesses.

MARTIN FISCHER.

Witnesses:
 JOHANNES ARMUND,
 AUGUST RÜEGG.